United States Patent [19]

Edmaier et al.

[11] Patent Number: 5,627,822
[45] Date of Patent: May 6, 1997

[54] METHOD AND CIRCUIT ARRANGEMENT FOR DISTURBANCE-FREE REDIRECTION OF A MESSAGE CELL STREAM ONTO AN ALTERNATE ROUTE

[75] Inventors: Bernhard Edmaier, Seefeld; Wolfgang Fischer, Germering, both of Germany

[73] Assignee: Siemens Aktiengesellschaft, Munich, Germany

[21] Appl. No.: 438,786

[22] Filed: May 11, 1995

[30] Foreign Application Priority Data

May 11, 1994 [DE] Germany ............. 44 16 718.0

[51] Int. Cl.$^6$ ................................................. H04L 1/22
[52] U.S. Cl. .................. 370/218; 370/390; 370/503; 340/825.01
[58] Field of Search ............ 370/16, 60.1, 100.1; 455/8, 59; 340/825.01, 827; 371/68.1, 68.2; 375/260, 267, 354

[56] References Cited

U.S. PATENT DOCUMENTS 5,241,534  8/1993  Omuro et al. ..................... 455/8
5,268,897  12/1993  Komine et al. .................... 370/60
5,479,396  12/1995  Kusano ............................ 370/16

OTHER PUBLICATIONS

"Hitless Line Protection Switching Method for ATM Networks", H. Ohta et al, IEEE International Conference on Communications ICC (1993), pp. 272-276.

Primary Examiner—Benedict V. Safourek
Attorney, Agent, or Firm—Hill, Steadman & Simpson

[57] ABSTRACT

Within a cell-oriented communication network, a switching equipment (CCa) located at the start of a path pair duplicates a message cell stream supplied thereto for redirection. The message cell streams resulting therefrom are separately supplied to a switching equipment (CCb) located at the end of the path pair via an active path (AP) and via an alternate path (EP) of the path pair allocated thereto. A decentralized synchronization means (SY) or, respectively, a plurality of decentralized synchronization means (SY1, SY2 or, respectively, SY3, SY4) is or, respectively, are provided therein, a synchronization of the two message cell streams ensuing therein while initially forwarding the message cell stream of the active path. After such a synchronization, only the message cell stream of the alternate path is then forwarded.

25 Claims, 7 Drawing Sheets

METHOD AND CIRCUIT ARRANGEMENT FOR DISTURBANCE-FREE REDIRECTION OF A MESSAGE CELL STREAM ONTO AN ALTERNATE ROUTE

BACKGROUND OF THE PRESENT INVENTION

The present invention is directed to a method and circuit arrangement for the redirection of a message cell stream via an alternate route in a cell-oriented communication network.

Such a method and circuit arrangement are already known from Ohta, H. and H. Ueda, "Hitless Line Protection Switching Method for ATM Networks", IEEE International Conference on Communications ICC'93, pages 272 through 276. Given this known method or, respectively, given this known circuit arrangement, a separate control means is respectively provided at the output of a switching equipment located at the start of a line pair as well as at the input of a switching equipment located at the end of the line pair. A message stream to be transmitted is thereby duplicated by the control means located at the appertaining output in order to transmit two identical message cell streams over the line pair to the control means that is located at the end of the line pair and is formed of two line-associated buffers. The latter effects a synchronization of the two supplied message cell streams as well as a forwarding of the message cell stream transmitted over a line of the line pair defined as an alternate route after the synchronization has ensued. Three different methods are described for this. One of these methods amounts to a bit-by-bit comparison of the message cells transmitted over the line pair. In a further method, identical control cells (OAM cells) are inserted into the two message cell streams, whereby the appearance of the control cells is separately monitored in the two buffers. The appearance of a control cell in the leading message cell stream initially forwarded via a selector thereby leads to an interruption of this forwarding. The selector is then redirected with the appearance of a control cell in the trailing message cell stream, so that only this message cell stream if forwarded from this time on. In the remaining method, finally, the control cells are periodically inserted into the two message streams. Only the forwarding of the method cells without switching the selector is thereby triggered by the appearance of the control cells in the trailing message cell stream. Further particulars with respect to the control cells employed and their evaluation in the line-associated buffers, however, cannot be derived from this publication.

SUMMARY OF THE INVENTION

It is an object of the present invention to provide a method and circuit arrangement for implementing a disturbance-free redirection of a message cell stream from an active route or path onto an alternate route or path.

Two different methods for the redirection of a message cell stream from an active path onto an alternate path are disclosed in copending patent application (P95,1023 corresponding to German reference P 43 31 577.1). According to a first of these methods, only the message cells transmitted via the active path are initially forwarded via an input belonging to this active path at a switching equipment located at the end of the path pair, whereas the message cells transmitted via the alternate path of the respective path pair are initially discarded at an input of the appertaining switching equipment allocated to this alternate path. Given an interruption of the active path, the switching equipment located at the end of the path pair is supplied with an interrupt signal upon whose appearance the input belonging to the alternate path and the input of the appertaining switching equipment belonging to the active path are controlled by an internal control signal such that the message cells transmitted via the alternate path are subsequently forwarded, but the message cells transmitted via the active path are discarded.

According to the second method, the message cells transmitted via the active path and via the alternate path are forwarded up to that output of the switching equipment located at the end of the path pair that comes into consideration for the path pair. The plurality of message cells arriving via the active path and via the alternate path is thereby continuously and separately acquired at the appertaining output. Given the presence of a plurality of message cells arriving via the alternate path that is a predetermined value above the plurality of message cells arriving via the alternate path, the message cells arriving via the alternate path are forwarded, whereas the message cells arriving via the active path are discarded.

In general terms the method of the present invention is a method for redirecting a message cell stream transmitted via an active path in a virtual path or, respectively, in the course of a virtual connection onto an alternate path that forms a virtual path pair together with the active path in a cell-oriented communication network having a plurality of switching equipment. The message cell stream is duplicated in a switching equipment located at the start of the path pair and the two message cell streams resulting therefrom are separately supplied via the active path and via the alternate path to a switching equipment located at the end of the path pair. The two message cell streams transmitted via the path pair are monitored by the switching equipment located at the end of the path pair such that only one of the two message cell streams is forwarded via an interface means of the output side that belongs to this switching equipment. The two message cell streams are supplied to a synchronization means that belongs to the appertaining interface means and is at least temporally allocated to this virtual path or, respectively, virtual connection. Only the message cell stream transmitted via the active path is initially forwarded by the synchronization means, while the two message cell streams are synchronized. When such a synchronization has been achieved, the message cell stream supplied via the alternate path is now forwarded via the interface means instead of the message cell stream supplied via the active path.

In another embodiment each of the two message cell streams is separately supplied to one of two synchronization means that is at least temporarily allocated to the appertaining virtual path or, respectively, to the appertaining virtual connection. The synchronization means belongs to an interface means of the input side located in the active path or, respectively, the alternate path at the switching equipment located at the end of the path pair. The two synchronization means are initially controlled such that the supplied message cell stream is forwarded to the interface means of the output side only by the synchronization means located in the active path. The message cell stream supplied via the alternate path is suppressed by the synchronization means located in this alternate path. The message cell streams are synchronized by the two synchronization means. When such a synchronization has been achieved, the two synchronization means are controlled such that the message cell stream supplied via the alternate path is now forwarded via the interface means instead of the message cell stream supplied via the active path.

The present invention has the advantage that a path-associated or, respectively, call-associated redirection of a message cell stream from an active route onto an alternate route can be implemented with a comparatively slight control-oriented outlay. In particular, a disturbance-free redirection is guaranteed by the transmission of continuously changing sequence numbers in predetermined control cells and by the evaluation of these sequence numbers.

Advantageous developments of the method of the present invention are as follows.

The duplication of the message cell stream in the switching equipment located at the start of the path pair is implemented only in response to a request signal. The alternate path is only defined and set up in response to the request signal.

The alternate path and the transmission capacity required for it are already defined together with the active path, but the transmission of the message cell stream ensues exclusively via the active path until the appearance of the request signal. In another embodiment, Only the course of the alternate path is defined together with the active path, but the transmission capacity required for this alternate path is only requested in response to the request signal.

The transmission capacity required for the alternate path is used for low-priority message traffic until the appearance of the request signal.

In a further development of the method of the present invention a respective control cell is inserted at respectively predetermined time intervals in the two message cell streams supplied to the synchronization means or, respectively, to the plurality of synchronization means. A sequence number continuously varying from control cell to control cell is respectively contained in the control cells. A synchronization of the two message cell streams in view of the compensation of the differences in running time caused by the active path and by the alternate path is undertaken by the synchronization means or, respectively, by the plurality of synchronization means based on the criterion of the sequence numbers appearing in the control cells of the two message cell streams. In a further development the compensation of the differences in running time is implemented step-by-step by the synchronization means or, respectively, by the plurality of synchronization means.

In general terms the circuit arrangement of the present invention is for redirecting a message cell stream transmitted via an active path in a virtual path or, respectively, during the course of a virtual connection onto an alternate path that forms a virtual path pair together with the active path in a cell-oriented communication network having a plurality of switching equipment. The message cell stream is duplicated in a switching equipment located at the start of the path pair and the two message cell streams resulting therefrom are separately supplied via the active path and via the alternate path to a switching equipment located at the end of the path pair. The two message cell streams transmitted via the path pair are monitored by the switching equipment located at the end of the path pair such that only one of the two message cell streams is forwarded via an interface means of the output side belonging to this switching equipment. The two message cell streams are supplied to a synchronization means that belongs to the appertaining interface means and is at least temporarily allocated to this virtual path or, respectively, virtual connection. Only the message cell stream transmitted via the active path is initially forwarded, while the two message cell streams are synchronized. The message cell stream supplied via the alternate path is then forwarded via the interface means, when such a synchronization has been achieved, instead of the message cell stream supplied via the active path.

In another embodiment of the circuit arrangement each of the two message cell streams is separately supplied to one of two synchronization means that are at least temporarily allocated to the appertaining virtual path or, respectively, to the appertaining virtual connection. The two synchronization means belong to an interface means of the input side located in the active path or, respectively, alternate path at the switching equipment located at the end of the path pair. The synchronization means is coupled to one another and fashioned such that the supplied message cell stream is initially forwarded to the interface means of the output side only by the synchronization means located in the active path. The message cell stream supplied via the alternate path is suppressed by the synchronization means located in this alternate path. The message cell streams are synchronized by the two synchronization means. When such a synchronization has been achieved, the message cell stream supplied via the alternate path is now forwarded via the interface means instead of the message cell stream supplied via the active path.

Advantageous developments of the present invention are as follows.

The respective synchronization means has first memory means for the acceptance of the message cell stream transmitted via the active path, as well as, second memory means for the acceptance of the message cell stream transmitted via the alternate path. The first and second memory means are respectively followed by evaluation means traversed by the respective message cell stream which have their output side connected to switch means and by which the appearance of control cells in the respective message cell stream is respectively monitored. Sequence numbers contained in the control cells are supplied to a control means. The control means is connected to the first and second memory means, as well as, to the switch means. Only the message cell stream transmitted via the active path is first forwarded via the switch means. The leading message cell stream is identified based on the criterion of the sequence numbers appearing in the two message cell streams. The leading message cell stream is delayed in the first or, respectively, second memory means for a synchronization of the two message cell streams until a sequence number appears in the trailing message cell stream that corresponds to the sequence number identified for the leading message cell stream. After the synchronization has been achieved, only the message cell stream arriving via the alternate path is forwarded via the switch means.

In the other embodiment each of the two synchronization means has memory means for the acceptance of the message cell stream transmitted via the active path (AP) or, respectively, via the alternate path. The memory means are followed by evaluation means traversed by the respective message cell stream with which the appearance of control cells in the respective message cell stream is monitored and sequence numbers contained in the control cells are supplied to a control means. The control means of the two synchronization means are connected to the appertaining memory means, as well as, to one another such that only the message cell stream transmitted via the active path is initially forwarded to the interface means of the output side under the control of one of the two control devices functioning as a master control means. The leading message cell stream is identified by the master control means based on the criterion of the sequence numbers supplied thereto by the appertaining evaluation means and by the remaining control means functioning as slave control means. For a synchronization of the message cell streams transmitted via the active path and via the alternate path under the control of the master control means, the leading message cell stream is delayed by direct control of the memory means allocated to this master control means or, respectively, by indirect control of the memory means allocated to the slave control means until a sequence number appears in the trailing message cell stream that corresponds to the sequence number identified for the leading message cell stream. After the synchronization has been achieved under the control of the master control means, only the message cell stream arriving via the alternate path is forwarded to the interface means of the output side.

Each of the two synchronization means has memory means for the acceptance of the message cell stream transmitted via the active path or, respectively, via the alternate path. The memory means are followed by evaluation means traversed by the respective message cell streams with which the appearance of control cells in the respective message cell stream is monitored. Sequence numbers contained in the control cells are supplied to a central control means allocated in common to the two synchronization means. The central control means is connected to the memory means, as well as, to the evaluation means of the two synchronization means such that only the message cell stream transmitted via the active path is initially forwarded to the interface means of the output side. The leading message cell stream is identified based on the criterion of the sequence numbers appearing in the message cell streams transmitted via the active path and via the alternate path. The leading message cell stream is delayed in the respective memory means for a synchronization of the two message cell streams until a sequence number appears in the trailing message cell stream that corresponds to the sequence number identified for the leading message cell stream. After synchronization has been achieved, only the message cell stream arriving via the alternate path is forwarded via the interface means of the output side. The central control means is connected via a bus line system to the memory means and to the evaluation means of the two synchronization means.

In another embodiment the central control means is connected to the memory means and to the evaluation means of the two synchronization means via a ring line system.

The advantage of the inventive circuit arrangement as well as of the developments thereof is in the low circuit-oriented outlay for a disturbance-free redirection of a message cell stream from an active route onto an alternate route.

BRIEF DESCRIPTION OF THE DRAWINGS

The features of the present invention, which are believed to be novel, are set forth with particularity in the appended claims. The invention, together with further objects and advantages may best be understood by reference to the following description taken in conjunction with the accompanying drawings, in the several Figures of which like reference numerals identify like elements, and in which:

DESCRIPTION OF THE PREFERRED EMBODIMENTS

Figure 1:
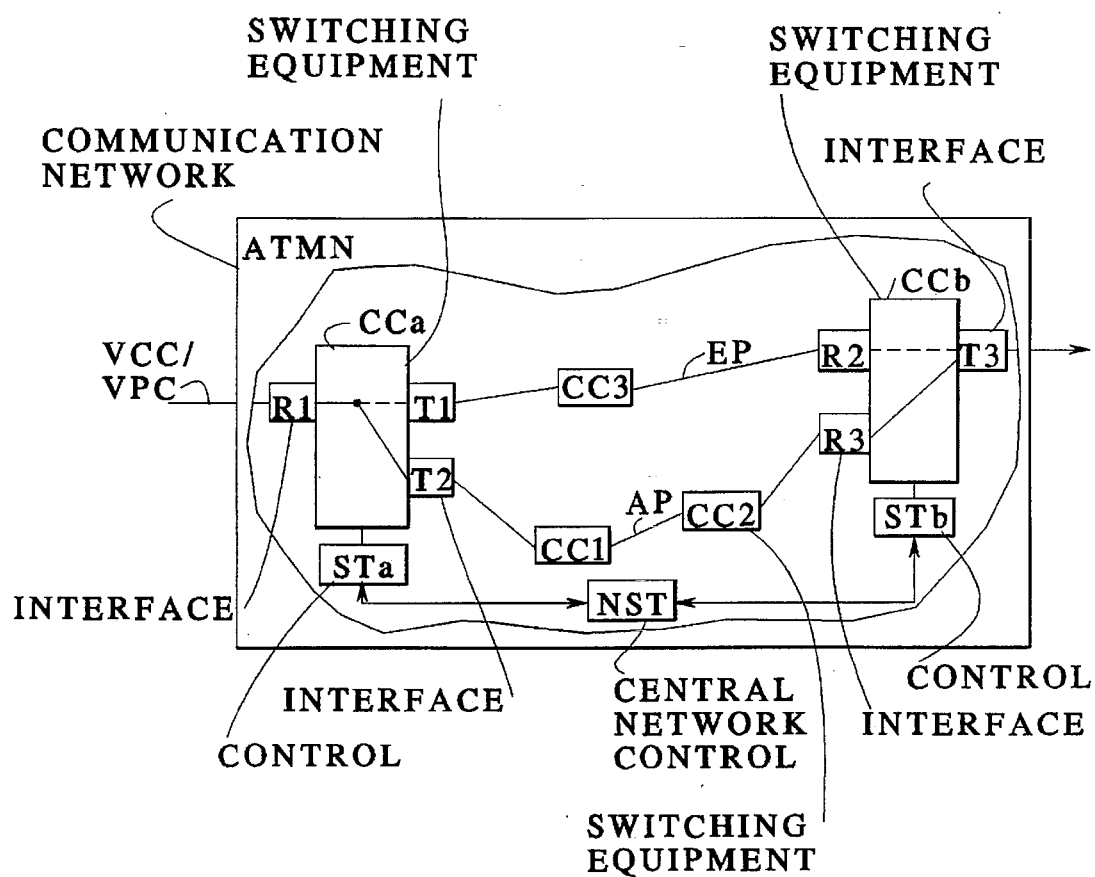
FIG. 1 shows portions of a cell-oriented communication network wherein the present invention is applied in a block circuit diagram.

FIG. 1 shows portions of an ATM communication network operating according to an asynchronous transfer mode and has a plurality of switching equipment. Within this ATM communication network, virtual connections that are set up in a known way and proceed in the same direction are conducted, for example, via what are referred to as virtual paths, that is the virtual paths each respectively carry a plurality of virtual connections. Let the switching equipment thereby be fashioned as what are referred to as "cross connects" via which virtual paths are permanently established and maintained over a longer time. These switching equipment, however, can also be composed of switching equipment via which virtual paths can be selectively set up during the course of a corresponding call setup. Since such a virtual path can, for example, contain up to 65536 virtual connections and can also comprise a high aggregate bit rate of, for example, up to 2.5 Gbytes/s, such a virtual path must be redirected as quickly as possible as needed onto an alternate route in a disturbance free manner, that is without loss of message cells, without duplication of cells, without falsification of information in the individual cells and while adhering to the cell sequence. An alternate path is therefore defined within the ATM communication network for every path, referred to below as active path. The respective active path and the appertaining alternate path shall be referred to below as path pair and thereby proceed via separate routes. Let it already be pointed out here that the present invention shall in fact be set forth below with reference to virtual paths set up within the ATM communication network but that it can also be applied to individual virtual connections or, respectively, path groups that can respectively proceed via a path pair formed of an active path and of an alternate path.

Standing for a plurality of virtual path pairs proceeding within the ATM communication network ATMN, FIG. 1 schematically shows a virtual path pair that can be set up between two switching equipment CCa and CCb. The switching equipment Cca thereby represents the start of the virtual path pair and is supplied at an interface means R1 with the message cells appearing within an offering path VPC. Proceeding from the switching equipment CCa, the active path AP proceeds via an interface means T2 connected thereto as well as via two intermediate switching equipment CC1 and CC2 to an interface means R3 of the switching equipment CCa. The appertaining alternate path EP, by contrast, proceeds via an interface equipment T1 belonging to the switching equipment CCa and an intermediate switching equipment CC3 to an interface means R2 of the switching equipment CCb. In a normal case, let message cells thereby be forwarded only over the active path AP to an interface means T3 representing an output of the switching equipment CCb. Only under the control of a network control means NST, which is connected to a control means STa allocated to the switching equipment CCa and to a control means STb allocated to switching equipment CCb, is a switch made from the active path AP onto the appertaining alternate path EP as shall be set forth in greater detail below, that is the message cells arriving over this alternate path EP are forwarded to the interface means T3 after the switchover.

Dependent on the design of the ATM communication network, moreover, the alternate path EP can be defined either only in response to the initiation based on the criterion of the network load and on the required transmission capacity, or can already be defined with respect to the route, whereby a transmission capacity corresponding to the transmission capacity is then requested for the alternate path EP only in response to an initiation. The requested transmission capacity can thereby be used for a low-priority message traffic until an initiation.

Three exemplary embodiments of a method for switching from the active path AP onto the alternate path EP shall be discussed in greater detail below with reference to FIGS. 2 through 7.

Figure 2:
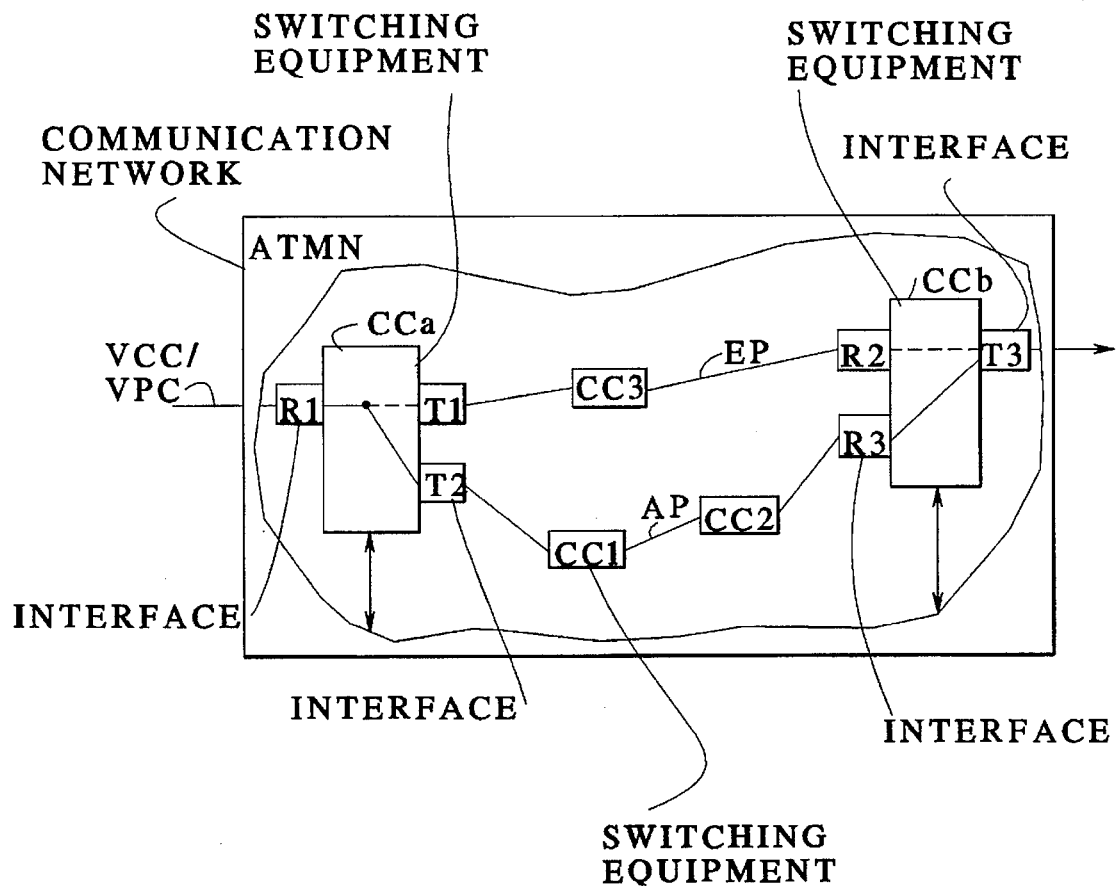
FIG. 2 shows a first exemplary embodiment of the present invention.
Figure 3:
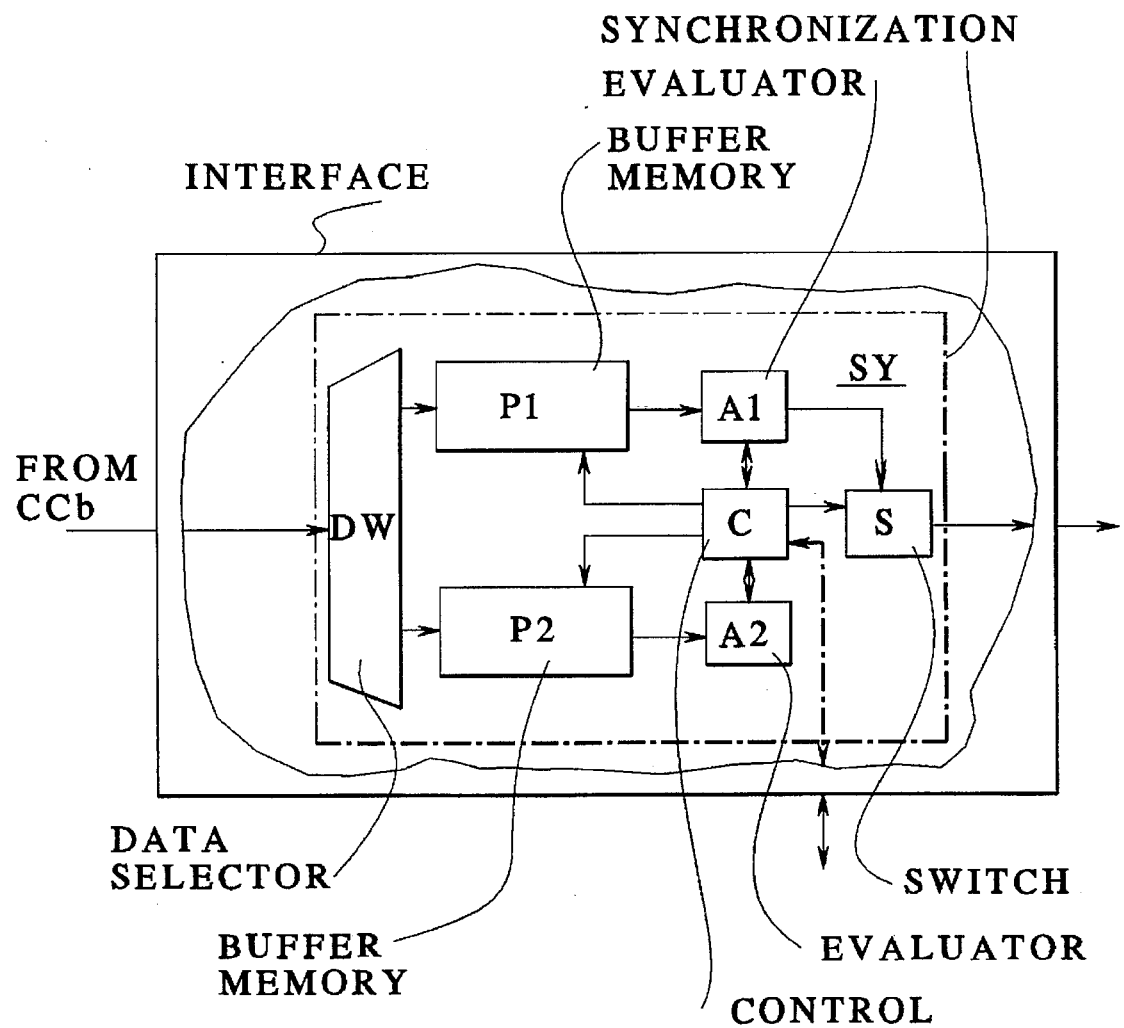
FIG. 3 shows portions of a possible structure of an interface means of the output side schematically shown in FIG. 2.

In a first exemplary embodiment shown in FIG. 2, the switching from the active path AP onto the alternate path EP ensues using a synchronization means that is present in the interface means T3 and is at least temporarily assigned to the active path. One embodiment of this interface means T3 is depicted in FIG. 3. It is thereby assumed that message cells initially arriving via the offering path VPC are exclusively transmitted over the active path AP to the interface means T3 of the switching equipment CCb proceeding from the interface means R1 of the switching equipment CCa. For this purpose, let the message cells be forwarded with the switching equipment CCa and CCb according, for example, to what is referred to as the "self-routing" principle, in that an internal "self-routing" cell header is placed in front of every message cell upon entry into the respective switching equipment based on the criterion of the external cell header respectively present therein. This internal cell header is offered, for example by a control means STa, STb allocated to the respective switching equipment CCa, CCb, during the course of setting up the virtual path and contains all routing information for the forwarding of the message cells belonging to the virtual path within the respective switching equipment CCa, CCb. In the case of the switching equipment CCa, these are information for the transmission of message cells between the interface means R1 and the interface means T2. By contrast thereto, the internal cell header offered for the virtual path in the switching equipment CCb contains information for the transmission of message cells from the interface means R3 to the interface means T3. The respective internal cell header is thereby stored in the interface means R1 or, respectively, R3 and in corresponding interface means of the remaining switching equipment of the communication network ATMN involved in the virtual path.

Instead of the "self-routing" principle, moreover, what is referred to as the route interpreter principle can also be alternatively employed for the forwarding of message cells within the respective switching equipment, only the external cell header belonging to the respective message cell being modified therein.

A switching of the virtual path AP onto the alternate path EP is initiated in response to a redirect signal that, for example, is supplied to the control means STa, STb of one of the switching equipment CCa and CCb proceeding from a central network control means NST in the form of at least one control cell ("operation, administration and maintenance" cell) referred to below as OAM cell. Let the control means that receives such a redirect signal thereby be, for example, the control means STb allocated to the switching equipment CCb. In response thereto, this control means offers an internal cell header in the interface means R2 that contains routing information order to supply the message cells belonging to the appertaining alternate path EP to the interface means T3 proceeding from this interface means. Additionally, a synchronization means (which shall be set forth in greater detail below) that is present in the interface means T3 is activated in response to this request signal. Subsequently, a control signal in the form of at least one OAM cell indicating the activation of the synchronization means is transmitted to the control means STa of the switching equipment CCa either proceeding from this interface means T3 or from the appertaining control means STb. For example, a virtual control channel set up between the two switching equipment CCb and CCa can be used for this purpose, this virtual control channel being set up, for example, in a path that is allocated to the active path AP but proceeds in the opposite direction. In response to the appearance of such an OAM cell, the internal cell header stored until then in the interface means R1 for the virtual path AP is then modified by the control means STa such that following message cells of the virtual path are duplicated and the message cells that derive therefrom and are allocated to one another are separately transmitted via the active path AP and the appertaining alternate path EP. The interface means T3 is thus supplied with a respective message cell stream both via the active path AP and via the alternate path EP. In a synchronization phase that is now initiated by the aforementioned synchronization means, however, only the message cells supplied via the active path AP are initially forwarded. During the synchronization phase (which shall be discussed in greater detail below), however, the message cell streams arriving via the active path AP and the alternate path EP are synchronized in that the different delay times that appear on these paths are compensated. When a shorter delay time thereby occurs on the active path than on the alternate path, then the message cells transmitted over the active path are delayed in order to achieve synchronism with the message cells on the alternate path. When, by contrast, the message cells on the alternate path have a shorter delay than the appertaining message cells on the active path, then the message cells transmitted over the alternate path are correspondingly delayed.

Given a synchronization achieved as a result thereof, a switch is then made onto the alternate path, that is only the message cells arriving via the alternate path are forwarded to the interface means T3 beginning from this point in time. The control means STa belonging to the switching equipment CCb, for example, is informed of the switch which has thus been concluded with a corresponding OAM cell. Over and above this, a control signal in the form of at least one OAM cell indicating the switch onto the alternate path is supplied to the control means STa of the switching equipment CCa, whereupon the internal cell header previously stored in the interface means R1 is modified under the control of the control means STa such that following message cells are forwarded only via the alternate path EP.

It was assumed above that the redirect signal (OAM cell or, respectively, cells) had been supplied to the control means STb proceeding from the network control means NST. Alternatively thereto, this OAM cell or cells can also be supplied to the control means STa of the switching equipment CCa. In this case, a defined OAM cell is first transmitted to the control means STb proceeding from the control means STa over, for example, the active path AP, the above-described control events sequencing in response thereto in the control means STb and, subsequently, in the control means STa. That is, the part-time transmission of message cells proceeding from the switching equipment CCa both via the active path AP as well as via the alternate path EP and the subsequent, exclusive transmission of message cells via the alternate path EP only ensue after the switching equipment CCb has output an OAM cell that indicates that the cut-in of the central synchronization means AS has been accomplished.

The aforementioned synchronization method as well as a possible structure of the central synchronization means in the interface means T3 shall now be discussed in greater detail. Only those circuit parts of this central synchronization means that are relevant to an understanding of the present invention are thereby recited. According thereto, the central synchronization means SY has a data selector DW at the input side to which the message cell stream appearing via the active path AP proceeding from the switching equipment CCb is first supplied and to which the message cell stream appearing via the alternate path EP during the synchronization phase is subsequently additionally supplied in multiplex mode. An especially identified OAM cell is thereby respectively inserted into the respective message cell stream at predetermined time intervals, for example by the switching equipment CCa. These OAM cells respectively have a sequence number that changes continuously from OAM cell to OAM cell. In the present exemplary embodiment, a respective OAM cell is inserted after respectively 256 message cells, while delaying the respective message cell stream, and the respective sequence number is coded by 8 bits. Alternatively thereto, a dummy or empty cell, that is contained in the respective message cell stream and follows the predetermined plurality of message cells, can also be replaced by such an OAM cell. When such a dummy cell thereby does not appear within a predetermined time, for example a time defined by 128 cells, than an OAM cell is designationally inserted into the message cell stream, namely while delaying the message cell stream by one cell. Given this procedure, however, the predetermined time intervals for the insertion of OAM cells should be adhered to on average.

Proceeding from the data selector DW, the message cell stream of the active path AP passes through a buffer memory P1, whereas the message cell stream of the alternate path EP is supplied to a buffer memory P2. Each of these buffer memories P1, P2 is followed by a separate evaluation means A1, A2, whereby these evaluation means A1, A2 are in communication in common with a control means C. This is connected to a control input of a switch means S that represents the output of the central synchronization means SY and that also has its input side operatively connected to respective outputs of the evaluation means A1, A2. In response to the appearance of an aforementioned OAM cell that requests a switchover, this switch means S is thereby driven by the control means C such that only those message cells passing through the buffer memories P1 and P2 that arrive via the active path AP are initially forwarded. In response to the appearance of the aforementioned redirect signal, however, the respective evaluation means A1, A2 constantly monitors the appearance of OAM cells and the respective OAM cell is supplied to the control means C. On the basis of the sequence number respectively carried in the OAM cells, this first determines which of the two message cell streams is the leading message cell stream. Following message cells of the leading message cell stream are then intermediately stored in the respective buffer memory (P1 or P2) under the control of the control means C before being forwarded until a sequence number appears in the trailing message cell stream that corresponds to the sequence number that was just identified for the leading message cell stream. Given equality of these sequence numbers, that is when synchronization of the two message cell streams has been achieved, the switch means S is then driven by the control means C such that only message cells arriving via the alternate path are then forwarded.

For that case wherein the message cell stream transmitted via the active path is the leading message cell stream, there is thereby also the possibility in the present exemplary embodiment of implementing a gradual delay instead of the abrupt delay that was just set forth. In this embodiment this message cell stream is delayed step-by-step under the control of the control means C when passing through the buffer memory P1 until two identical sequence numbers are simultaneously present in the control means C. In a corresponding way, a delay to be initially realized for the alternate route can in turn be gradually dismantled after the switchover has ensued. This gradual modification of the delay thereby yields the advantage that delay time fluctuations can be kept within tolerable limits. This is especially significant when audio, video or multimedia connections that require guaranteed, minimum delay time fluctuations proceed within the virtual path to be switched. The burst size caused by the forwarding of message cells is also limited by such a gradual delay.

That case wherein a single active path can be redirected onto an allocated alternate path using the synchronization means SY shown in FIG. 3 was considered above only as an example. Such a synchronization means can also be allocated to a plurality of virtual paths in multiplex mode when these are to be sequentially switched onto an allocated alternate path. Given a required, simultaneous redirection of virtual paths, a plurality of central synchronization means corresponding in number to the plurality of virtual paths to be simultaneously switched can be provided.

Figure 4:
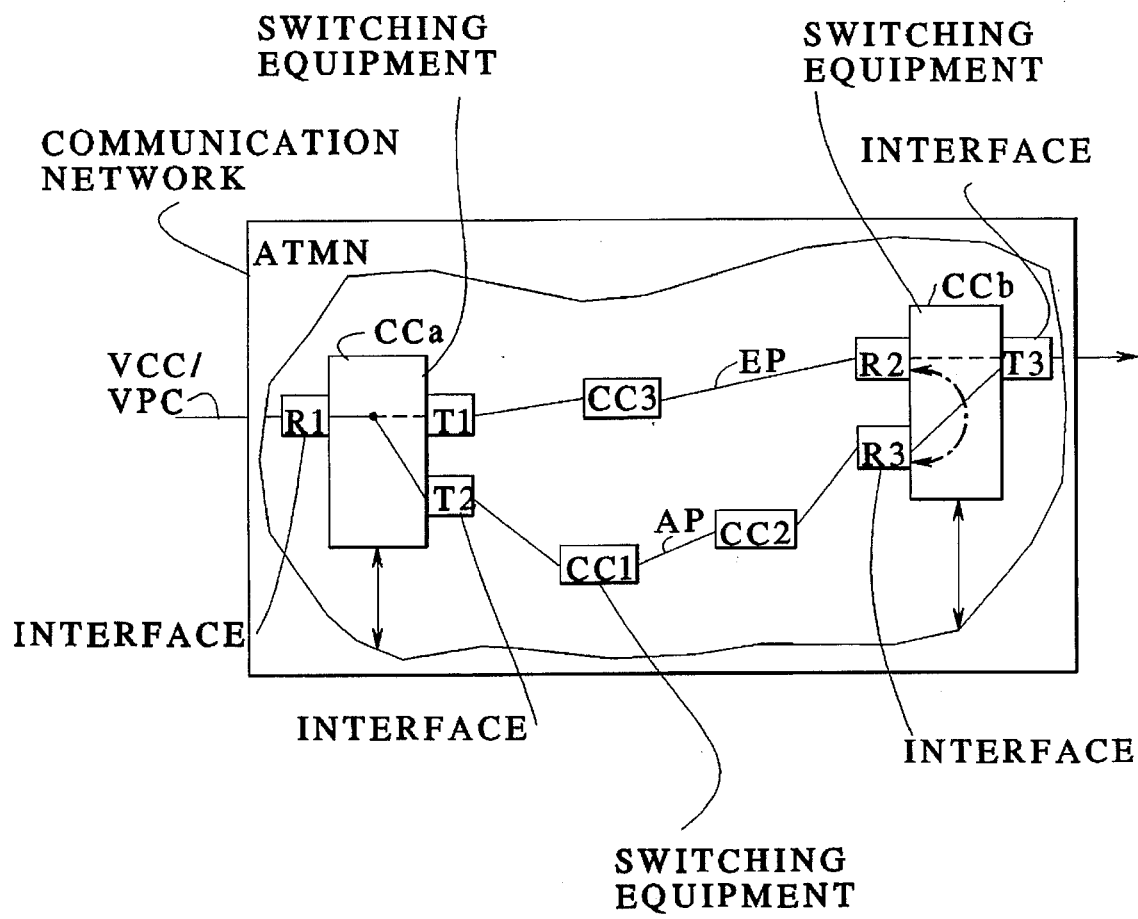
FIG. 4 shows a second exemplary embodiment of the present invention.
Figure 5:
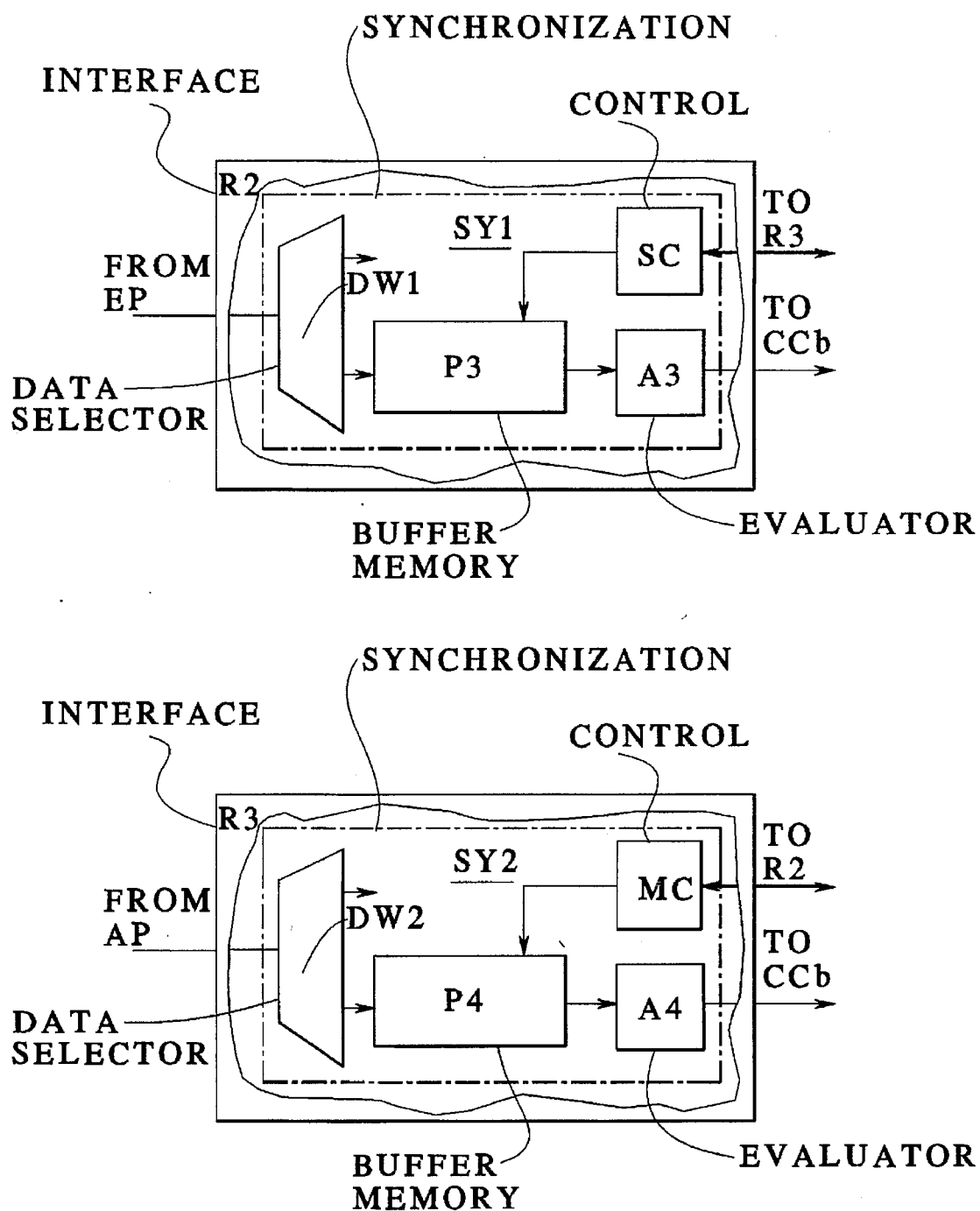
FIG. 5 shows portions of a possible structure of two interface means of the input side that are schematically shown in FIG. 4.

A further exemplary embodiment of the redirection of a message cell stream from the active path AP onto the alternate path EP is shown in FIGS. 4 and 5. In this exemplary embodiment, control events corresponding to the above-explained control events sequence in the switching equipment CCa and CCb in response to a redirect signal output by the network control means NST (FIG. 1). One difference, however, is that the synchronization of the two message cell streams transmitted via the active path AP and via the alternate path EP ensues in the interface means R2 and R3 belonging to the switching equipment CCb in this second exemplary embodiment. As indicated in FIG. 4, a communication route via the switching equipment CCb is set up between two synchronization means that are contained in the interface means R2 and R3 and are at least temporarily allocated to the active path and to the alternate path. They are set up with the appearance of an aforementioned redirect signal under the control of the control means STb allocated to the switching equipment CCb. These synchronization means are shown in FIG. 5, whereby the synchronization means SY1 belongs to the interface means R2, and the synchronization means SY2 belongs to the interface means R3.

According to FIG. 5, the message cell streams of the active path AP supplied to the interface means R3 passes through a data selector DW2 composed of a buffer memory P4 which is followed by an evaluation means A4. This is in communication, on the one hand, with a control means MC, which assumes a master function yet to be set forth, and, on the other hand, is in connection with the switching network of the switching equipment CCb. In a corresponding way, the synchronization means SY1 belonging to the interface means R2 has a data selector DW1, a buffer memory P3, an evaluation means A3 as well as a control means referenced SC, whereby the latter assumes a slave function, by contrast to the control means belonging to the synchronization means SY2.

Until the appearance of an afore-mentioned redirect signal, only the message cells of the active path AP supplied to the interface means R3 are forwarded to the interface means T3 shown in FIGS. 1 and 4. The message cells of the alternate path EP supplied to the interface means R2, by contrast, are suppressed under the control of the control means SC. In response to the appearance of a redirect signal, the control means MC and SC are activated by the control means STb allocated to the switching equipment CCb such that, independently of one another, they evaluate the OAM cells supplied from the appertaining evaluation means R1 in view of the sequence number respectively contained therein. The sequence numbers identified by the control means SC are thereby supplied to the control means MC via the afore-mentioned communication route. On the basis of the supplied sequence numbers, this then determines in which of the two synchronization means SY1 and SY2 a delay is to be implemented. When this is the synchronization means SY2, then this delay of message cells is controlled in the way set forth above by the control means MC. After the delay has been carried out, which can also ensue gradually here, the control means SC is then supplied with a control signal, for example in the form of a OAM cell again, from the control means MC via the communication route in order to indicate that the message cells supplied to the synchronization means SY1 are to be forwarded to the interface means T3. At the same time, the message cells supplied to the synchronization means via the active AP are suppressed under the control of the control means MC with the output of this control signal. Otherwise, that is when a delay is to be implemented in the synchronization means SY1, the control means SC is supplied with control signals (OAM cells) with sequence numbers received therefrom proceeding from the control means MC in order to control a corresponding delay of message cells, potentially to be gradually implemented. After the delay has been carried out, control signals (OAM cells) are exchanged between the two control means MC and SC in order to subsequently forward the message cell stream supplied to the interface means R2 to the interface means T3, namely while suppressing the message cell stream supplied to the interface means R3. The required redirection of the message cell stream from the active path AP onto the alternate path EP has thus been concluded.

Let it also be pointed out with respect to the synchronization means SY1 and SY2 shown in FIG. 5 that further circuit elements composed of a buffer memory, a following evaluation means and a control means can be connected to the data selector respectively appertaining thereto in order to be able to simultaneously switch a plurality of virtual paths onto allocated alternate paths. Alternatively thereto, the respective buffer memory (P3, P4) can also be fashioned as a shared buffer memory for a plurality of virtual paths, so that the appertaining data selector can be foregone.

Figure 6:
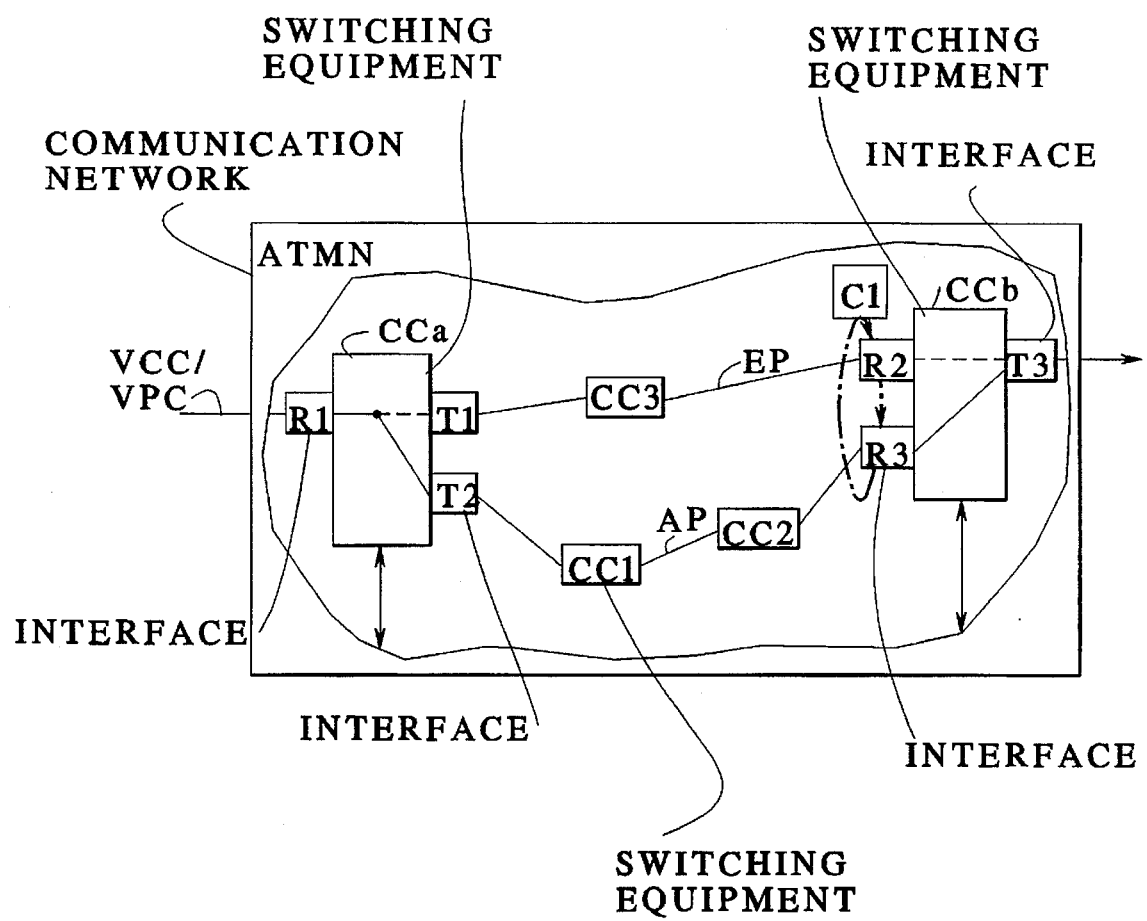
FIG. 6 shows a third exemplary embodiment of the present invention.
Figure 7:
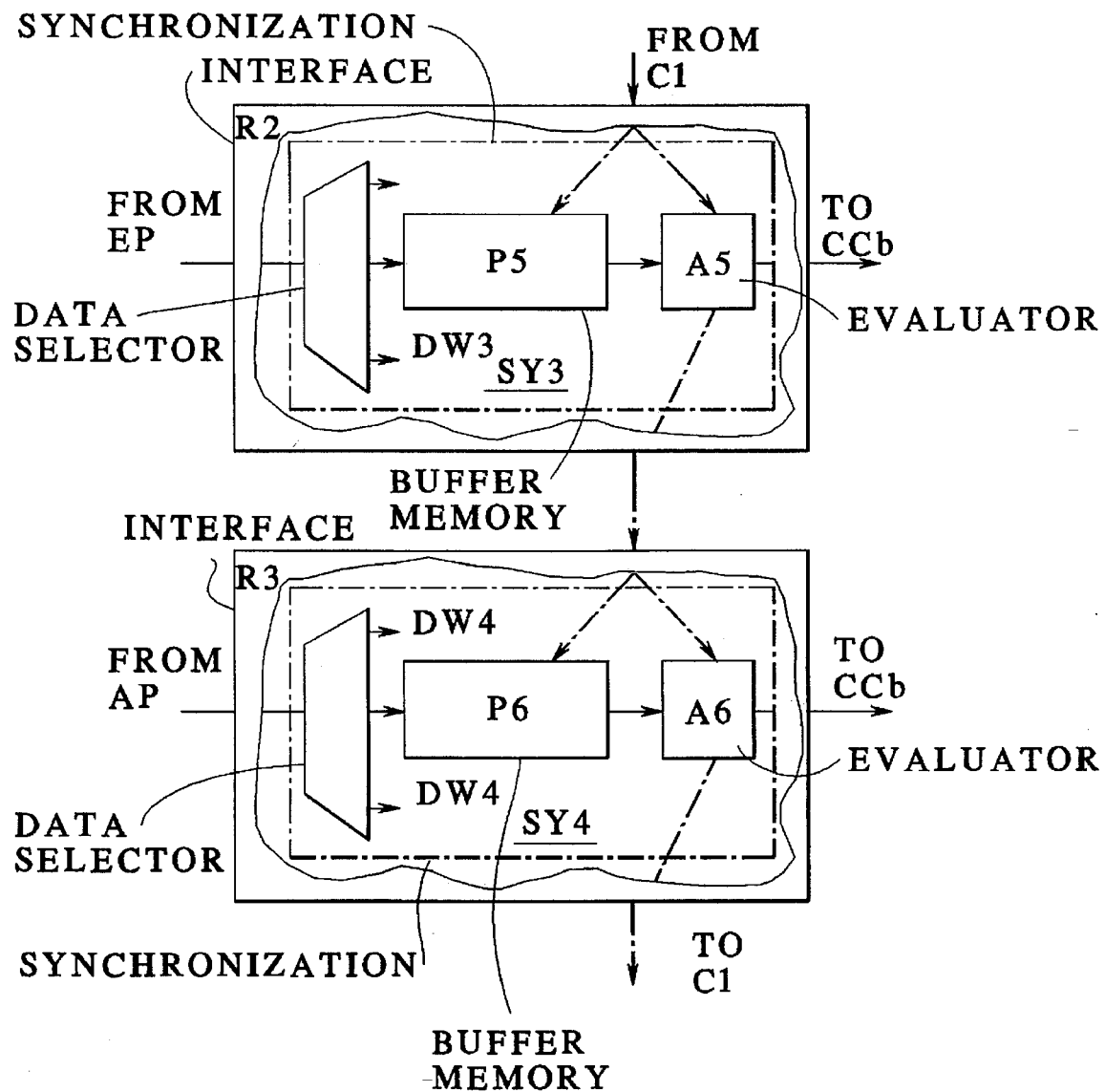
FIG. 7 shows a possible structure of two interface means of the input side schematically shown in FIG. 6.

FIGS. 6 and 7, finally, show a third exemplary embodiment for the redirection of a message cell stream from an active path onto an alternate path. As in the exemplary embodiment set forth with reference to FIGS. 4 and 5, the synchronization and the switching onto the alternate path after the synchronization has been carried out ensues in this exemplary embodiment using synchronization means that are present in the interface means R2 and R3 and are at least temporally allocated to the active path with the alternate path. The synchronization means SY3 belongs to the interface means R2. By contrast thereto, the synchronization means SY4 belongs to the interface means R3. According to FIG. 7, the synchronization means SY3 has a data selector DW3 available to it that serves for the acceptance of a message cell stream and to which a buffer memory P5 is connected. This is followed by an evaluation means A5 which forms the output of the respective synchronization means. In a corresponding way, the synchronization means SY4 contains a data selector DW4, a buffer memory P6 and an evaluation means A6 following thereupon. In terms of their function, these circuit parts correspond to the above-described circuit elements that are referenced DW1, DW2, P3, P4, A3 and A4 in FIG. 5. One difference compared to the synchronization means SY1 and SY2 shown in FIG. 5, however, is that the synchronization means SY3 and SY4 shown in FIG. 7 do not have individual control means. On the contrary, a central control means C1 is provided here according to FIG. 6, this corresponding in terms of its function and the connection to the respective buffer memory and the respective evaluation means to the control means C set forth with reference to FIG. 3. After the appearance of an afore-mentioned redirect signal, namely, the sequence numbers that are supplied by the two evaluation means R2 and are contained in OAM cells are evaluated by this control means C1 in order to delay the message cell stream that is leading at the moment on the basis of these sequence numbers, gradually again as warranted.

According to FIG. 6, the central control means C1 is connected to the synchronization means SY3 and SY4 via a line system. This, for example, can be fashioned as a ring line system or as a redundant bus line system with forward and return direction. Given the latter, the central control means C1 can belong or, respectively can be allocated to the head stations present in such a bus line system. Arbitrary communication protocols can thereby be used for the communication with the evaluation means A5 and A6 as well as for the control of the buffer memories P5 and P5. As examples, let the DQDB protocol according to the IEEE standard 802.6 as well as the CRMAII protocol be cited here.

With respect to the synchronization means SY3 and SY4 shown in FIG. 7, let it be pointed out that further circuit elements composed of a buffer memory and of a following evaluation means are connectable to the data selector DW3 or, respectively, DW4 respectively belonging to these synchronization means in order to simultaneously switch a plurality of virtual paths onto allocated alternate paths. Alternatively thereto, the respective buffer memory P5 or, respectively, P6 can also be fashioned as a shared buffer memory for a plurality of virtual paths, so that the appertaining data selector DW3 or, respectively, DW4 can be eliminated. Over and above this, a plurality of synchronization means can be connected to the line system (ring line system or, respectively, redundant bus line system), these belonging to interface means of the input side at the switching equipment CCb (FIG. 6). The redirection of a plurality of message cell streams from an active path onto an alternate path can be controlled in this way by the central control means C1.

In conclusion, let it also be pointed out that the above method for redirecting virtual paths onto alternate paths can also be modified such that a message cell stream supplied proceeding from the switching equipment CCa can, as a result of duplication, be constantly transmitted both via the active path as well as via an allocated alternate path and the two message cell streams resulting therefrom are supplied to the above-explained synchronization means shown in FIGS. 3, 5 and 7. In the latter, an above-explained synchronization constantly ensues in order to be able to switch onto the remaining path, given outage of one of the paths.

The present invention is not limited to the particular details of the method and apparatus depicted and other modifications and applications are contemplated. Certain other changes may be made to the above described method and apparatus without departing from the true spirit and scope of the invention herein involved. It is intended, therefore, that the subject matter in the above depiction shall be interpreted as illustrative and not in a limiting sense.

What is claimed is:

1. A method for redirecting a message cell stream transmitted via an active route in a virtual route or during the course of a virtual connection, onto an alternate route that forms a virtual route pair together with the active route in a cell-oriented communication network having a plurality of switching equipment, comprising the steps of:

provided a first switching equipment located at a start of the route pair and a second switching equipment located at an end of the route pair, the start and end of the route pair being connected by the active route and the alternate route;

supplying a message cell stream to the first switching equipment;

duplicating the supplied message cell stream to form duplicate first and second message cell streams in the first switching equipment located at the start of the route pair;

separately supplying the first and second message cell streams via the active route and via the alternate route, respectively, to the second switching equipment located at the end of the route pair;

monitoring the first and second message cell streams transmitted via the route pair by the second switching equipment located at the end of the route pair such that only one of the first and second message cell streams is forwarded via an interface means at an output side of the second switching equipment;

supplying the first and second message cell streams to a synchronization means associated with the interface means, the synchronization means being at least temporally allocated to said virtual route or virtual connection;

initially forwarding only the first message cell stream, transmitted via the active route, by the synchronization means;

synchronizing in the synchronization means the first and second message cell streams; and forwarding, when such a synchronization has been achieved by the synchronization means, the second message cell stream supplied via the alternate route via said interface means, instead of the first message cell stream supplied via the active route.

2. The method according to claim 1, wherein the duplication of the message cell stream in the first switching equipment located at the start of the route pair is implemented only in response to a request signal.

3. The method according to claim 2, wherein the alternate route is only defined and set up in response to the request signal.

4. The method according to claim 2, wherein the alternate route and a transmission capacity required therefor are pre-defined together with the active route, transmission of the first message cell stream ensuing exclusively via the active route until appearance of the request signal.

5. The method according to claim 4, wherein the transmission capacity required for the alternate route is used for low-priority message traffic until appearance of the request signal.

6. The method according to claim 2, wherein the alternate route is pre-defined together with the active route, a transmission capacity required for the alternate route being only requested in response to the request signal.

7. The method according to claim 6, wherein the transmission capacity required for the alternate route is used for low-priority message traffic until appearance of the request signal.

8. The method according to claim 1, wherein the method further comprises:

inserting respective control cells at respectively predetermined time intervals in message cell streams supplied to the synchronization means, the respective control cells containing sequence numbers that continuously vary from control cell to control cell; and synchronizing the first and second message cell streams, with respect to compensation of differences in running time caused by the active route and by the alternate route, by the synchronization means using the sequence numbers appearing in the control cells of the first and second message cell streams.

9. The method according to claim 8, wherein the compensation of the differences in running time is implemented step-by-step by the synchronization means.

10. A method for redirecting a message cell stream transmitted via an active route in a virtual route or during the course of a virtual connection onto an alternate route that forms a virtual route pair together with the active route in a cell-oriented communication network having a plurality of switching equipment, comprising the steps of:

providing a first switching equipment located at a start of the route pair and a second switching equipment located at an end of the route pair, the start and end of the route pair being connected by the active route and the alternate route;

supplying a message cell stream to the first switching equipment;

duplicating the supplied message cell stream to form duplicate first and second message cell streams in the first switching equipment located at the start of the route pair;

separately supplying the first and second message cell streams via the active route and via the alternate route, respectively, to the second switching equipment located at the end of the route pair;

monitoring the first and second message cell streams, transmitted via the route pair by the second switching equipment located at the end of the route pair such that only one of the first and second message cell streams is forwarded at an output side of the second switching equipment;

separately supplying the first and second message cell streams to first and second synchronization means, respectively, the first and second synchronization means being at least temporarily allocated to the virtual route or the virtual connection, said first and second synchronization means belonging to input sides of first and second interface means, respectively, located in the active route and in the alternate route, respectively, of the second switching equipment located at the end of the route pair;

initially controlling the first and second synchronization means such that the first message cell stream is forwarded at the output side of the second switching equipment only by the first synchronization means located in the active route, whereas the second message cell stream supplied via the alternate route is suppressed by the second synchronization means located in the alternate route;

synchronizing the first and second message cell streams by the first and second synchronization means; and controlling, when such a synchronization has been achieved, the first and second synchronization means such that the second message cell stream supplied via the alternate route is now forwarded, instead of the first message cell stream supplied via the active route.

11. The method according to claim 10, wherein the duplication of the message cell stream in the first switching equipment located at the start of the route pair is implemented only in response to a request signal.

12. The method according to claim 11, wherein the alternate route is only defined and set up in response to the request signal.

13. The method according to claim 11, wherein the alternate route and a transmission capacity required therefor are pre-defined together with the active route, transmission of the first message cell stream ensuing exclusively via the active route until appearance of the request signal.

14. The method according to claim 13, wherein the transmission capacity required for the alternate route is used for low-priority message traffic until appearance of the request signal.

15. The method according to claim 11, wherein the alternate route without transmission capacity is pre-defined together with the active route, the transmission capacity required for the alternate route being only requested in response to the request signal.

16. The method according to claim 15, wherein the transmission capacity required for the route is used for low-priority message traffic until appearance of the request signal.

17. The method according to claim 10, wherein the method further comprises:

inserting respective control cells at respectively predetermined time intervals in message cell streams supplied to the first and second synchronization means, the respective control cells containing sequence numbers that continuously vary from control cell to control cell; and synchronizing the first and second message cell streams, with respect to compensation of differences in running time caused by the active route and by the alternate route, by the first and second synchronization means using the sequence numbers appearing in the control cells of the first and second message cell streams.

18. The method according to claim 17, wherein the compensation of the differences in running time is implemented step-by-step by the first and second synchronization means.

19. A circuit arrangement for redirecting a message cell stream transmitted via an active route in a virtual route or during the course of a virtual connection onto an alternate route that forms a virtual route pair together with the active route in a cell-oriented communication network having a plurality of switching equipment, comprising:

a first switching equipment located at a start of the route pair and a second switching equipment located at an end of the route pair, the start and end of the route pair being connected by the active route and the alternate route, a message cell stream supplied to the first switching equipment being duplicated to form duplicate first and second message cell streams;

the first switching equipment having a device for separately supplying the first and second message cell streams via the active route and via the alternate route, respectively, to the second switching equipment located at the end of the route pair;

the second switching equipment having a device for monitoring the first and second message cell streams transmitted via the route pair such that only one of the first and second message cell streams is forwarded at an output side of the second switching equipment;

a synchronization means associated with the interface means, the synchronization means receiving the first and second message cell streams and being at least temporally allocated to said virtual route; and the synchronization means forwarding initially forwarding only the first message cell stream while synchronizing the first and second message cell streams, and then forwarding, when such a synchronization has been achieved by the synchronization means, the second message cell stream supplied via the alternate route via said interface means, instead of the first message cell stream supplied via the active route.

20. The circuit arrangement according to claim 19, wherein the synchronization means has a first memory means for storing the first message cell stream transmitted via the active route and a second memory for storing the second message cell stream transmitted via the alternate route;

wherein said first and second memories are followed by first and second evaluation means, respectively traversed by the first and second message cell streams, respectively, which have respective output sides thereof connected to a switch and by which appearance of control cells in the first and second message cell streams, respectively are monitored and sequence numbers contained in the control cells are supplied to a control means;

wherein the control means is connected to the first and second memories and to the switch means;

wherein only the first message cell stream transmitted via the active route is initially forwarded via the switch, a leading message cell stream of the first and second message cell streams being identified by the sequence numbers appearing in the first and second message cell streams, the leading message cell stream being delayed in the first or, respectively, second memory for a synchronization of the first and second message cell streams until a sequence number appears in a trailing message cell stream of the first and second message cell streams that corresponds to the sequence number identified for the leading message cell stream, and after the synchronization has been achieved, only the second message cell stream arriving via the alternate route being forwarded via the switch.

21. A circuit arrangement for redirecting a message cell stream transmitted via an active route in a virtual route or during the course of a virtual connection onto an alternate route that forms a virtual route pair together with the active route in a cell-oriented communication network having a plurality of switching equipment, comprising:

a first switching equipment located at a start of the route pair and a second switching equipment located at an end of the route pair, the start and end of the route pair being connected by the active route and the alternate route, a message cell stream supplied to the first switching equipment being duplicated to form duplicate first and second message cell streams;

the first switching equipment having a device for separately supplying the first and second message cell streams via the active route and via the alternate route, respectively, to the second switching equipment located at the end of the route pair;

the second switching equipment having a device for monitoring the first and second message cell streams transmitted via the route pair such that only one of the first and second message cell streams is forwarded at an output side of the second switching equipment;

first and second synchronization means being at least temporarily allocated to the virtual route, or the virtual connection said first and second synchronization means belonging to input sides of first and second interface means, respectively, located in the active route and in the alternate route, respectively, of the second switching equipment located at the end of the route pair, the first and second synchronization means receiving the first and second cell streams, respectively;

the first and second synchronization means being coupled together and controlled such that the first message cell stream is forwarded at the output side of the second switching equipment only by the first synchronization means located in the active route, whereas the second message cell stream supplied via the alternate route is suppressed by the second synchronization means located in the alternate route;

the first and second synchronization means synchronizing the first and second message cell streams, and, when such a synchronization has been achieved, the first and second synchronization means being controlled such that the second message cell stream supplied via the alternate route is now forwarded, instead of the first message cell stream supplied via the active route.

22. The circuit arrangement according to claim 21, wherein each of the first and second synchronization means has a memory for storing a respective message cell stream of the first and second message cell streams transmitted via the active route or, respectively, via the alternate route, the memory being followed by an evaluation means traversed by the respective message cell stream with which appearance of control cells in the respective message cell stream is monitored and sequence numbers contained in the control cells are supplied to a control means; and wherein the control means in each of the first and second synchronization means is connected to the appertaining memory and to one another, wherein only the first message cell stream transmitted via the active route is initially forwarded to said interface means of the output side under the control of one of the two control devices functioning as master control means, wherein a leading message cell stream of the first and second message cell streams are identified by the master control means by the sequence numbers supplied thereto by the appertaining evaluation means and by the remaining control means functioning as slave control means; wherein, for a synchronization of the first and second message cell streams transmitted via the active route and via the alternate route under control of the master control means, the leading message cell stream is delayed by direct control of the memory allocated to this master control means or, respectively, by indirect control of the memory allocated to the slave control means until a sequence number appears in a trailing message cell stream of the first and second message cell streams that corresponds to the sequence number identified for the leading message cell stream, and wherein, after the synchronization has been achieved under control of the master control means, only the second message cell stream arriving via the alternate path is forwarded to said interface means of the output side.

23. The circuit arrangement according to claim 21, wherein each of the first and second synchronization means has a memory for storing a respective message cell stream of the first and second message cell streams transmitted via the active route or, respectively, via the alternate route, the memory means being followed by an evaluation means traversed by the respective message cell stream with which the appearance of control cells in the respective message cell stream is monitored and sequence numbers contained in the control cells are supplied to a central control means allocated in common to the first and second synchronization means; and wherein the central control means is connected to the memories and to the evaluation means of the first and second synchronization means, wherein only the first message cell stream transmitted via the active route initially forwarded to said interface means of the output side, wherein a leading message cell stream of the first and second message cell streams is identified by the sequence numbers appearing in the first and second message cell streams transmitted via the active route and via the alternate route, wherein the leading message cell stream is delayed in the respective memory means for a synchronization of the first and second message cell streams until a sequence number appears in a trailing message cell stream of the first and second message cell streams that corresponds to the sequence number identified for the leading message cell stream, and wherein, after synchronization has been achieved, only the second message cell stream arriving via the alternate route is forwarded via said interface means of the output side.

24. The circuit arrangement according to claim 23, wherein the central control means is connected via a bus line system to the memories and to the evaluation means of the first and second synchronization means.

25. The circuit arrangement according to claim 23, wherein the central control means is connected to the memories and to the evaluation means of the first and second synchronization means via a loop/ring line system.

* * * * *